United States Patent
Tamura

(10) Patent No.: US 8,879,077 B2
(45) Date of Patent: Nov. 4, 2014

(54) IMAGE PROCESSING APPARATUS, METHOD OF CONTROLLING THE SAME AND STORAGE MEDIUM

(75) Inventor: Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 13/544,435

(22) Filed: Jul. 9, 2012

(65) Prior Publication Data

US 2013/0021640 A1    Jan. 24, 2013

(30) Foreign Application Priority Data

Jul. 20, 2011 (JP) ................................. 2011-159276
Jun. 29, 2012 (JP) ................................. 2012-147601

(51) Int. Cl.
*G06F 3/12*     (2006.01)
*G06K 15/00*    (2006.01)
*H04N 1/44*     (2006.01)
*H04N 1/00*     (2006.01)

(52) U.S. Cl.
CPC ......... *H04N 1/00217* (2013.01); *H04N 1/4426* (2013.01); *H04N 1/00395* (2013.01); *H04N 1/0023* (2013.01); *H04N 1/444* (2013.01); *H04N 2201/0039* (2013.01); *H04N 1/00244* (2013.01); *H04N 1/4413* (2013.01); *H04N 1/00811* (2013.01); *H04N 1/00352* (2013.01)
USPC ................ 358/1.13; 358/1.15; 358/1.16

(58) Field of Classification Search
None
See application file for complete search history.

(56) References Cited

U.S. PATENT DOCUMENTS

2002/0156834 A1   10/2002   Kitada et al.
2010/0302579 A1*  12/2010   Nuggehalli et al. ......... 358/1.15

FOREIGN PATENT DOCUMENTS

JP      2008-293512 A    12/2008

* cited by examiner

*Primary Examiner* — Thomas Lett
(74) *Attorney, Agent, or Firm* — Fitzpatrick, Cella, Harper & Scinto

(57) ABSTRACT

An image processing apparatus communicable with a server via a network and a control method for the image processing apparatus. A comment including a request to transmit image data to a particular user is monitored, and upon detection of registration of a comment, authentication data of the image processing apparatus, necessary to transmit the image data to the server, is obtained. The image data is transmitted to the server using the obtained authentication data, and setting is made for sharing with the particular user with respect to the image data.

11 Claims, 11 Drawing Sheets

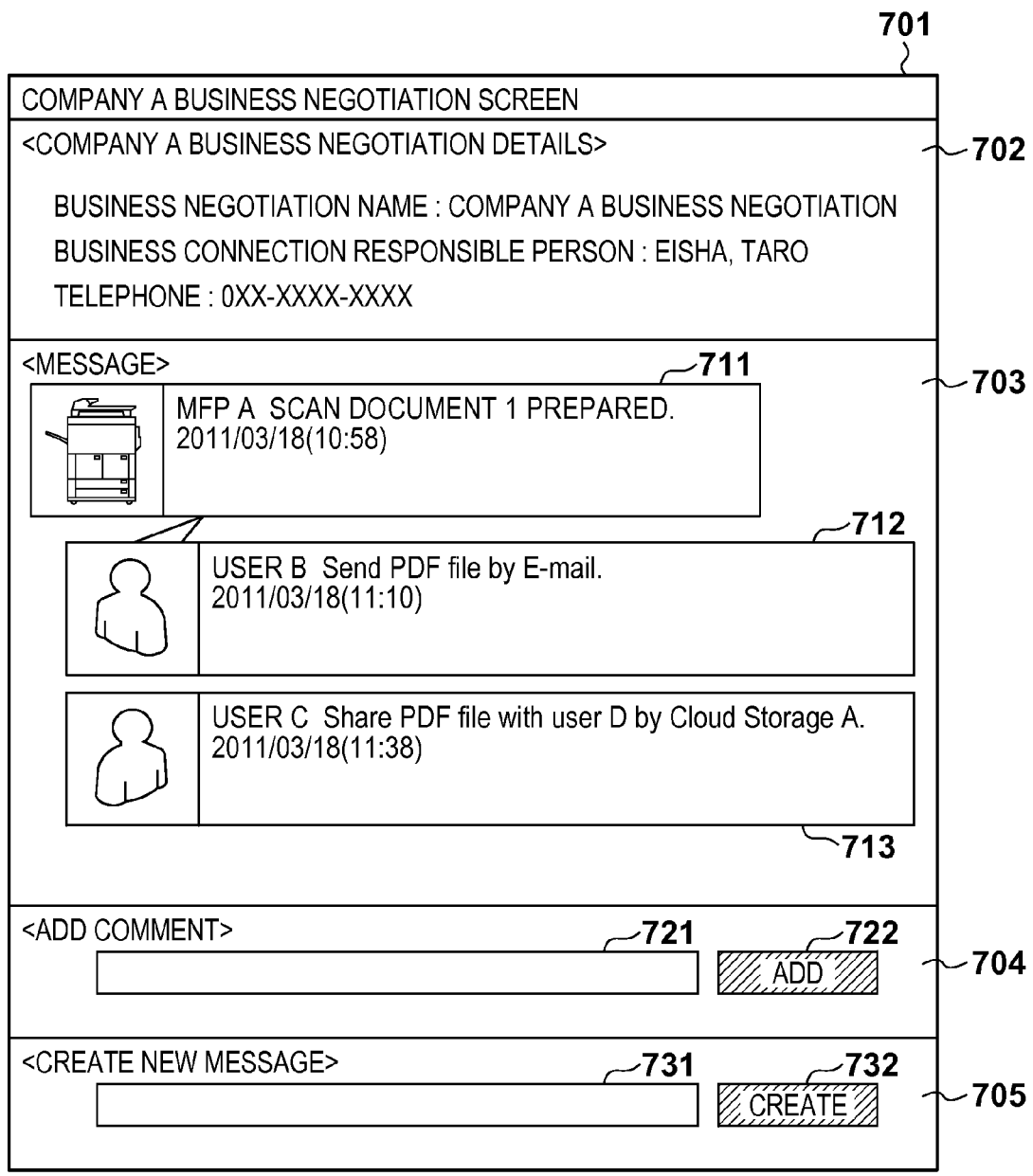

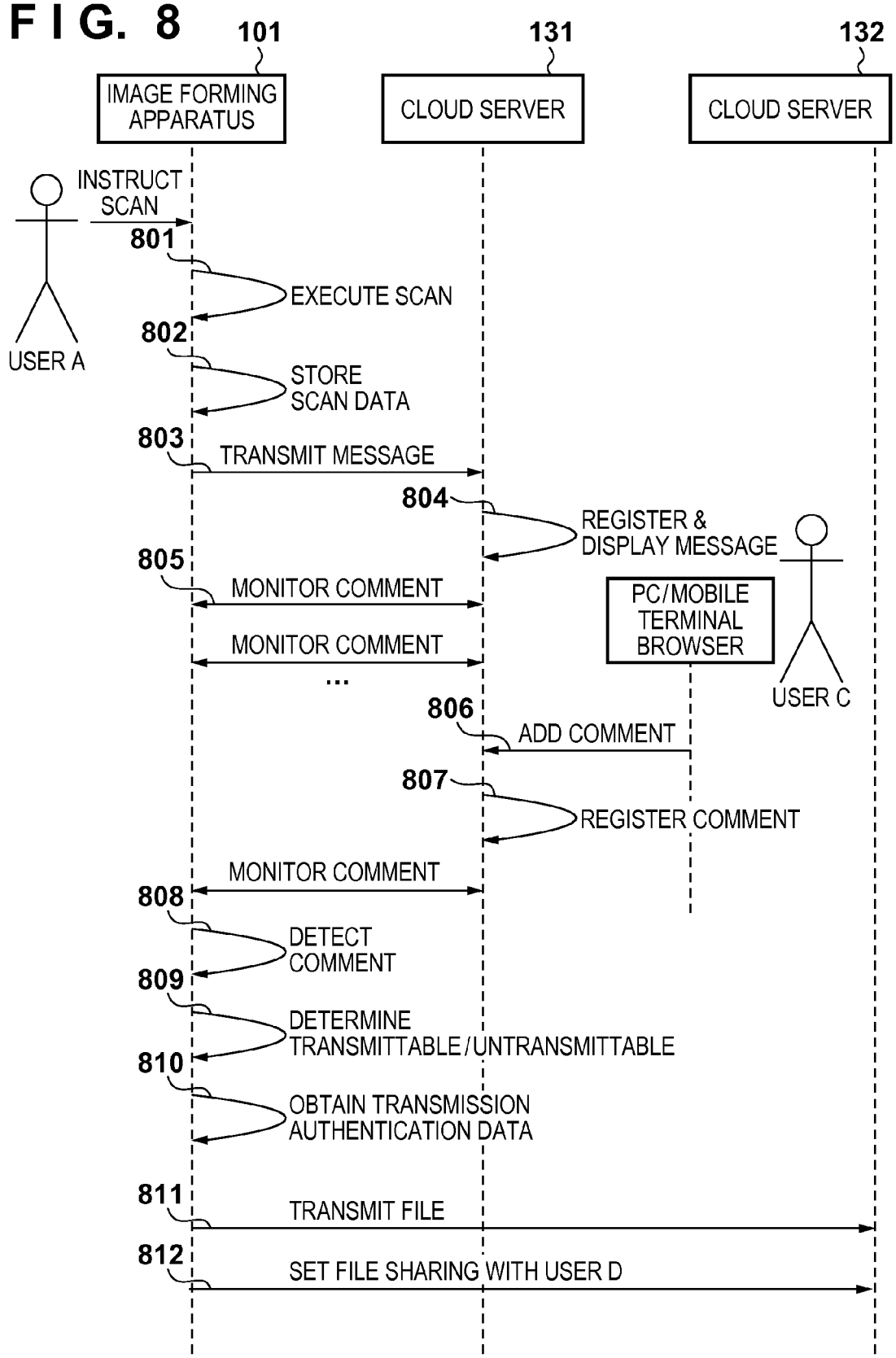

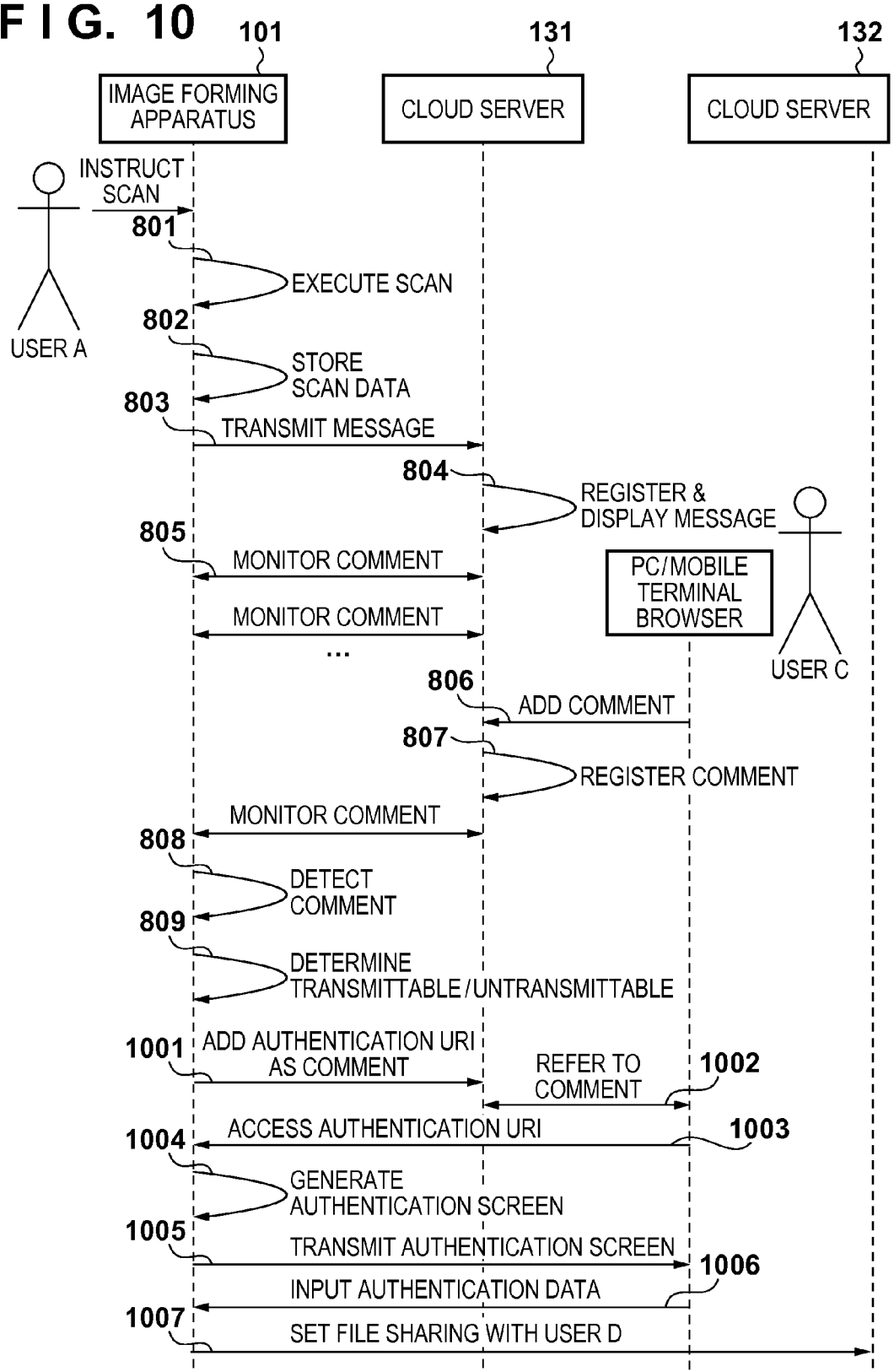

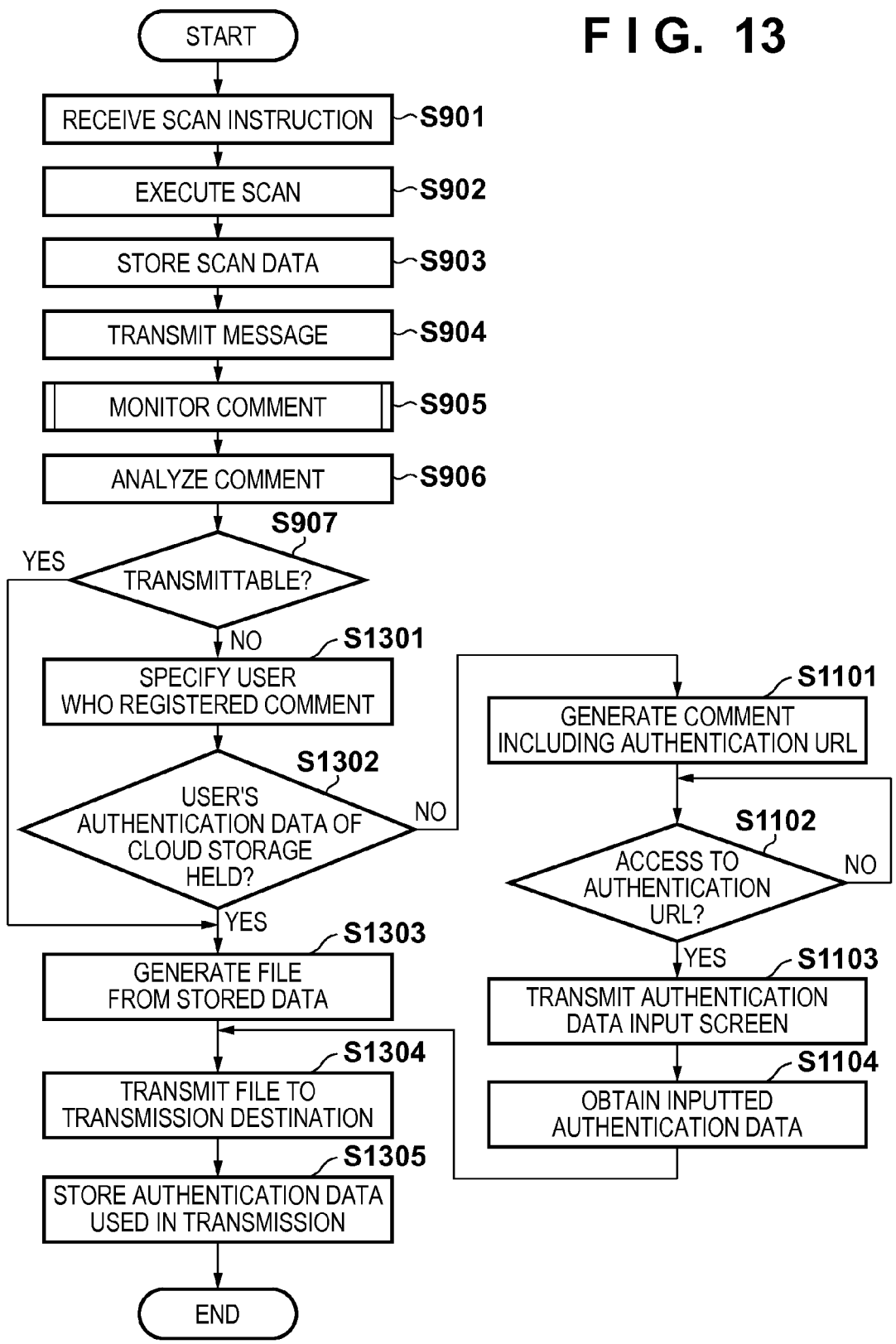

IMAGE PROCESSING APPARATUS, METHOD OF CONTROLLING THE SAME AND STORAGE MEDIUM

BACKGROUND OF THE INVENTION

1. Field of the Invention

The present invention relates to an image processing apparatus which is communicable with a server via a network and which transmits image data to the server, a method of controlling the image processing apparatus and a storage medium.

2. Description of the Related Art

In recent years, as a system to provide services utilizing the Internet, a cloud computing system is practically used. In such system, a user merely prepares a minimum connection environment, and can then utilize so-called cloud services provided by the cloud computing system. Among the existing cloud services, a CRM service to provide a CRM (Customer Relationship Management) function for customer management and a sales and marketing support is known. Further, as another cloud service, a document management service to provide storage for storing and managing electronic files as well as a management function is known.

Further, a service to provide a microblog function as a communication tool is known. The microblog function is a short blog function to disclose a short sentence including about 100 to 200 letters, which is called a "tweet", as a "message" or "comment". In this function, a unique identifier is allotted to each "message" or "comment" disclosed by a user. In the microblog function, when the user registers his/her "message", a "time line" to display a list of "comments" related to the registered "message" is generated. The user who registered the "message" and other users register information related to the "message" as "comments" on the "time line", thus exchange information in this manner.

Among the CRM services provided as cloud services, some services provide a microblog function as a communication tool. In these cloud services, customer information, business negotiation information are linked to messages and comments, thereby user convenience is further improved. For example, Salesforce.com provides "Chatter" as a microblog function.

Further, regarding image processing apparatuses, high-functionality apparatuses and multi-function apparatuses are becoming popularized. In recent years, an image processing apparatus having a network interface (hereinbelow, "network I/F") in addition to basic functions such as a scan function and a print function for electronization of paper documents and printing, has been developed. The image processing apparatus having the network I/F, in liaison with external services connected via the network, provides various solutions. For example, such image processing apparatus obtains image data by scanning a paper document, and for the purpose of storage of the data, transmits the image data to a cloud service providing a document management service.

Upon transmission of image data from the image processing apparatus to a cloud service, it is necessary to perform user authentication to utilize the cloud service. Information necessary for the user authentication (authentication data such as ID and/or password) differs by cloud service. Accordingly, upon each transmission of image data to a cloud service, it is necessary for the image processing apparatus to obtain authentication data of the transmission destination for the cloud service. As a solution of this problem, Japanese Patent Laid-Open No. 2008-293512 discloses a system having a relay server as an intermediary between an image forming apparatus and a cloud service. The relay server manages cloud service authentication data. The image forming apparatus once transmits an electronic file to the relay server, then the relay server, in place of the image forming apparatus, transmits the electronic file to the cloud service.

When the image processing apparatus transmits image data to a cloud service so as to distribute the image data to a particular user, in some cases, user authentication is required and it is not possible to perform appropriate distribution. For example, when image data is to be distributed to a user A, it is necessary for the image processing apparatus to log in to the cloud service using authentication data of the user A to transmit the image data. However, it is difficult for the image processing apparatus to previously obtain the authentication data of the user A. Further, when the image processing apparatus itself has a user account, it is possible for the image processing apparatus to log in to the cloud service using its authentication data to transmit image data to the user A. However, in this case, there is a possibility that the user A cannot access the transmitted image data.

SUMMARY OF THE INVENTION

An aspect of the present invention is to eliminate the above-mentioned problems with the conventional technology.

A feature of the present invention is to provide a technique for transmitting image data from an image processing apparatus to a cloud service to store the image data with the cloud service, and appropriately distribute the image data from the cloud service to a particular user.

According to an aspect of the present invention, there is provided an image processing apparatus communicable with a server via a network, comprising: a detection unit configured to detect a transmission request to transmit image data to a particular user; an acquisition unit configured to, in a case that the detection unit detects the transmission request, acquire authentication data of the image processing apparatus, necessary to transmit the image data to the server; a transmission unit configured to transmit the image data to the server using the authentication data acquired with the acquisition unit; and a setting unit configured to set sharing with the particular user with respect to the image data.

According to another aspect of the present invention, there is provided a control method for an image processing apparatus communicable with a server via a network, comprising: a detection step of detecting a transmission request to transmit image data to a particular user; an acquisition step of, in a case that the transmission request is detected in the detection step, acquiring authentication data of the image processing apparatus, necessary to transmit the image data to the server; a transmission step of transmitting the image data to the server using the authentication data acquired in the acquisition step; and a setting step of setting sharing with the particular user with respect to the image data.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is an explanatory diagram showing a microblog function provided from the cloud server to provide the CRM services;

FIG. 8 is a sequence diagram for describing operations of the image forming apparatus and cloud servers to perform a series of processing according to a first embodiment of the present invention;

FIG. 10 is a sequence diagram for describing the operations of the image forming apparatus and the cloud servers to perform the series of processing according to a second embodiment of the present invention;

FIG. 13 is a flowchart for describing the operation of the image forming apparatus according to the third embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that in the embodiments, the image processing apparatus according to the present invention will be described with reference to a multi function peripheral as an image forming apparatus.

Figure 1:
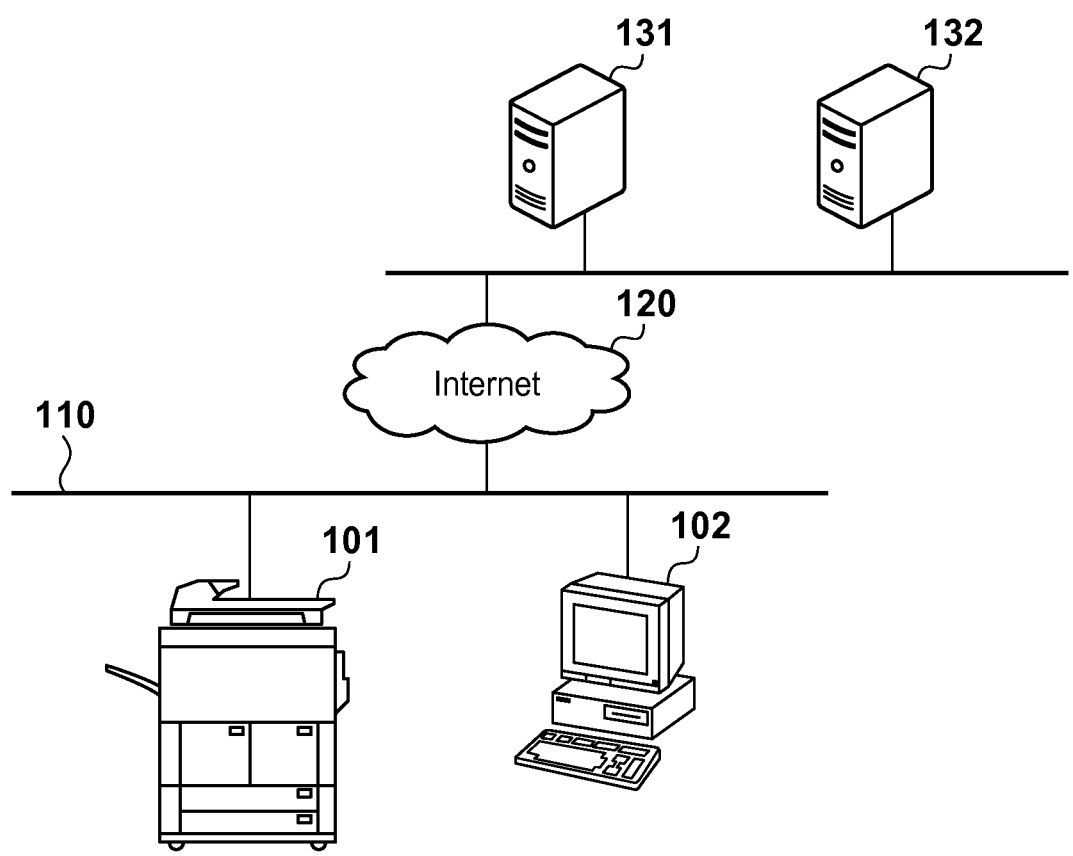
FIG. 1 illustrates the entire system configuration according to embodiments of the present invention.

FIG. 1 illustrates the entire system configuration according to the embodiments of the present invention.

An image forming apparatus 101 and a terminal 102, communicable with each other, are connected to a LAN 110. Further, the LAN 110 is connected to the Internet 120. A cloud server 131 to provide CRM services and a cloud server 132 to provide a document management service are connected to the Internet 120. The image forming apparatus 101 and the terminal 102 are also communicable with the cloud server 131 and the cloud server 132.

Figure 2:
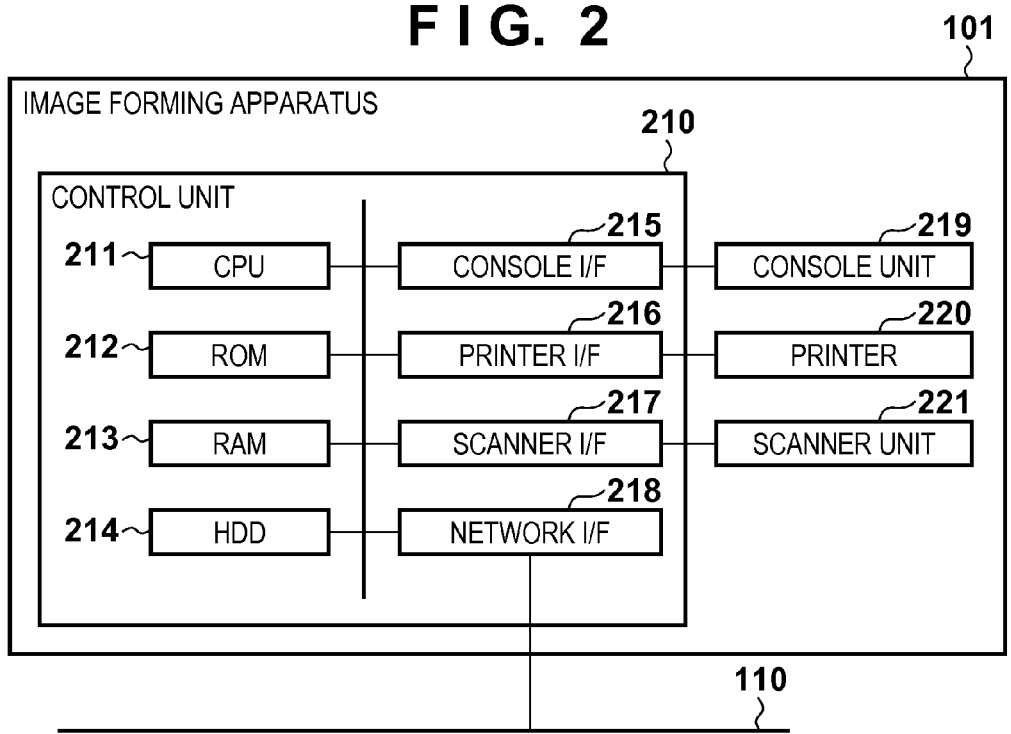
FIG. 2 is a block diagram showing a configuration of an image forming apparatus according to the embodiments.

FIG. 2 is a block diagram showing a configuration of the image forming apparatus 101 according to the embodiments. The image forming apparatus 101 will be described as a multi function peripheral (MFP) having a scan function, a print function, a facsimile function, a copier function and the like, however, the image processing apparatus according to the present invention is not limited to the multi function peripheral.

A control unit 210 including a CPU 211 controls the entire operation of the image forming apparatus 101. The CPU 211 reads a control program stored in a ROM 212 and performs various controls such as reading control and transmission control. A RAM 213 is used as a main memory for the CPU 211 and a temporary storage area such as a work area. An HDD 214 holds image data, various programs, or various information tables. A console interface (I/F) 215 connects a console unit 219 to the control unit 210. The console unit 219 is provided with a liquid crystal display unit having a touch panel function, a keyboard and the like. A printer I/F 216 connects a printer 220 to the control unit 210. Image data to be print-outputted with the printer 220 is transferred from the control unit 210 via the printer I/F 216, and print-outputted on a print medium (sheet) with the printer 220. A scanner I/F 217 connects a scanner unit 221 to the control unit 210. The scanner unit 221 reads an image on an original document and generates image data, then inputs the image data into the control unit 210 via the scanner I/F 217. A network I/F 218 connects the control unit 210 (image forming apparatus 101) to the LAN 110. The network I/F 218 transmits image data and information to an external device on the Internet connected via the LAN 110 (for example, the cloud server 132), or receives various information from an external device on the LAN 110.

Figure 3:
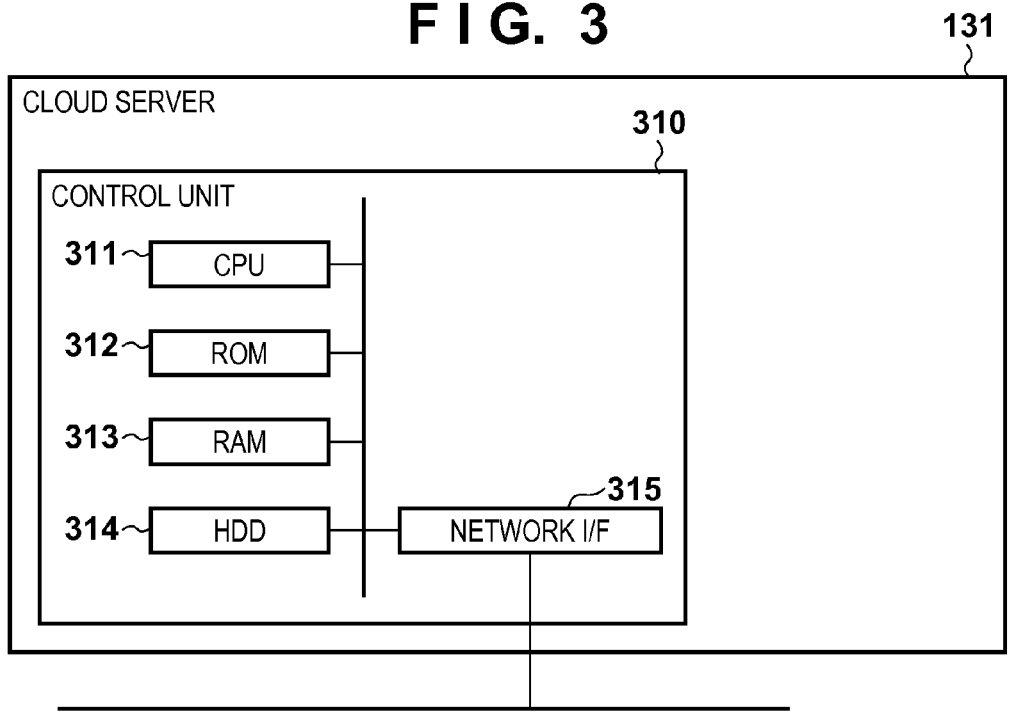
FIG. 3 is a block diagram showing a configuration of a cloud server according to the embodiments.

FIG. 3 is a block diagram showing a configuration of the cloud server 131 according to the embodiments.

A control unit 310 including a CPU 311 controls the entire operation of the cloud server 131. The CPU 311 performs various control processings by the OS and programs stored in the HDD 314 in accordance with a boot program stored in the ROM 312. The RAM 313 is used as a main memory for the CPU 311 and a temporary storage area such as a work area. The HDD 314 holds image data, various programs and various information tables to be described later. A network I/F 315 connects the control unit 310 (cloud server 131) to the Internet 120. The network I/F 315 transmits/receives various information to/from another device on the LAN 110 via the Internet 120.

Note that the cloud server 132 and the terminal 102 have the same configuration as that of the cloud server 131 described in FIG. 3, accordingly, the explanations of the configurations of these units will be omitted.

Figure 4:
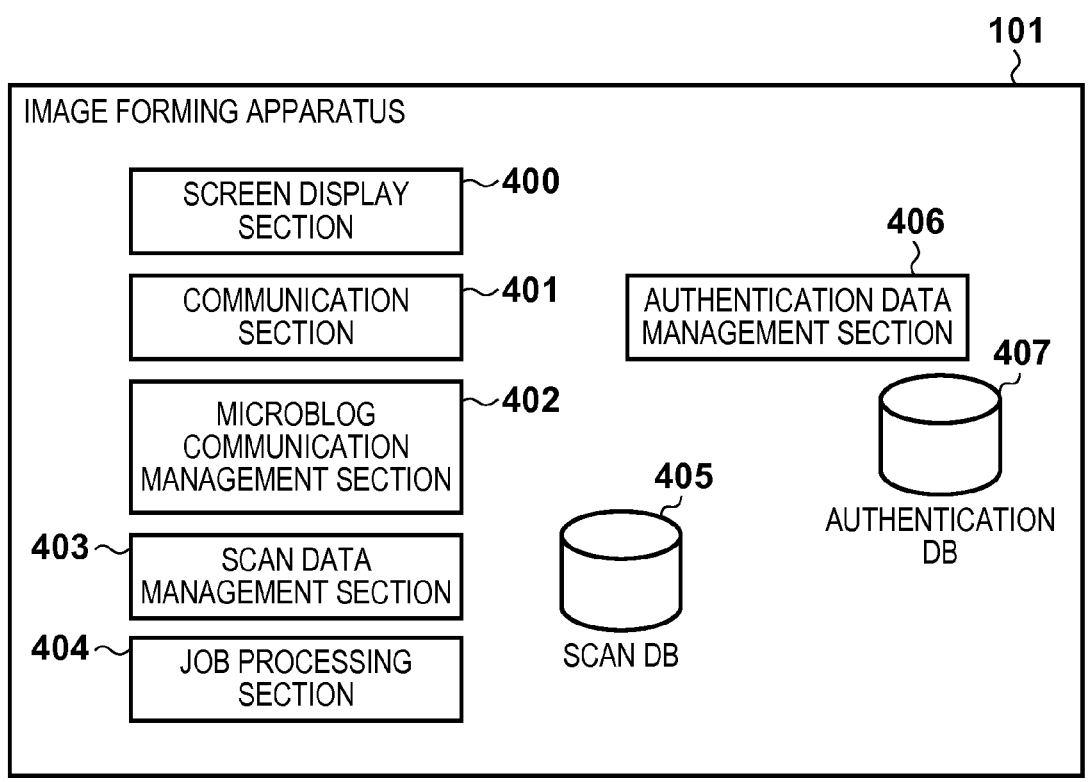
FIG. 4 is a functional block diagram showing a software configuration of the image forming apparatus.

FIG. 4 is a functional block diagram showing a software configuration of the image forming apparatus 101 according to the embodiments. The respective functional units shown in FIG. 4 are realized by execution of a control program by the CPU 211 of the image forming apparatus 101.

The image forming apparatus 101 has a screen display section 400, a communication section 401, a microblog communication management section 402, a scan data management section 403, a job processing section 404, a scan data database 405, an authentication data management section 406, and an authentication data database 407. Note that the scan data database 405 and the authentication data database 407 will be abbreviated as a scan DB 405 and an authentication DB 407.

The screen display section 400 displays an operation screen to instruct to perform a scan operation on a display unit of the consol unit 219. In accordance with a user's instruction using the operation screen, a scan job execution instruction is made with respect to the job processing section 404. The communication section 401 transmits a request to the cloud server 131 and the cloud server 132 in accordance with an instruction from the microblog communication management section 402. Further, the communication section 401 receives a response from the cloud server 131 and the cloud server 132 (reply to the request).

The microblog communication management section 402 detects storage of scan data into the scan DB 405 by a notification from the job processing section 404, and transmits a message to notify the storage of the scan data to the cloud server 131. For example, a message including a sentence "scan data prepared" is transmitted. Further, the microblog communication management section 402 manages comments with respect to the transmitted message. The scan data management section 403 instruct the scan DB 405 to store the scan data generated with the job processing section 404. Further, the scan data management section 403 obtains scan data stored in the scan DB 405. The job processing section 404 issues a request to perform scan processing to the control unit 210 in accordance with the scan job execution instruction from the screen display section 400. Then the scanner unit 221 reads an image on an original document, generates image data, and as a result, the job processing section 404 receives the generated image data. Then the job processing section 404 notifies the scan data management section 403 of the completion of preparation for storage of the image data, as scan data, into the scan DB 405. The scan DB 405 holds the scan data generated with the job processing section 404, in accordance with an instruction from the scan data management section 403. Further, the scan DB 405 also performs processing to obtain stored scan data and transmit the scan data to the scan data management section 403. The authentication data management section 406 performs processing to store authentication data to access the cloud server 132 into the authentication DB 407 or to obtain the authentication data from the authentication DB 407. The authentication DB 407 performs processing to hold the authentication data of the image forming apparatus 101, or obtain stored authentication data and transmit the data to the authentication data management section 406, in accordance with an instruction from the authentication data management section 406. Note that the authentication data of the image forming apparatus 101 stored in the authentication DB 407 is assigned to the image forming apparatus 101. That is, the image forming apparatus 101 itself has a user account and the image forming apparatus 101 has its own authentication data.

Figure 5:
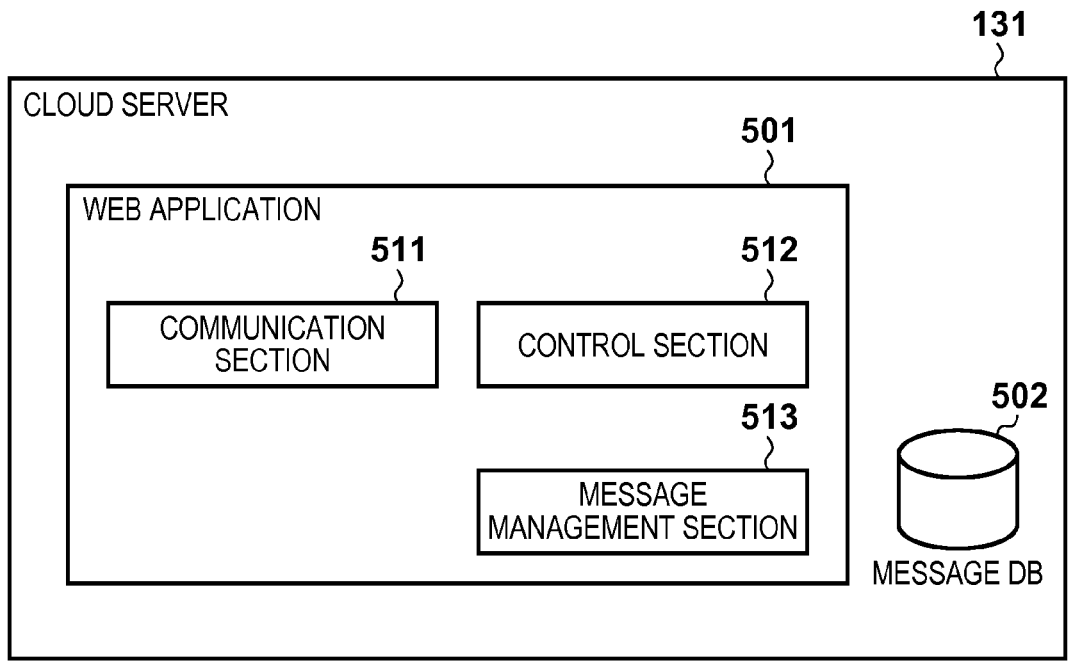
FIG. 5 is a functional block diagram showing a software configuration of a cloud server to provide CRM services.

FIG. 5 is a functional block diagram showing a software configuration of the cloud server 131 to provide CRM services according to the embodiments. The respective functional units shown in FIG. 5 are realized by execution of a control program by the CPU 311 of the cloud server 131.

The cloud server 131 has a Web application 501 and a message database 502 (hereinbelow, "message DB 502"). The Web application 501 is a Web application to provide CRM services and the like. In this example, the Web application 501 provides a microblog function. The Web application 501 has a communication section 511, a control section 512 and a message management section 513.

The communication section 511 receives a request from the image forming apparatus 101 and the terminal 102 such as a PC, and transmits the content of the request to the control section 512. Further, the communication section 511 receives the result of processing in response to the request, from the control section 512, generates response data to the request, and transmits the response to the image forming apparatus 101 and the terminal 102. The control section 512 extracts a message or comment included in the request, in accordance with the content of the request received from the communication section 511, and issues a request to register the message or comment to the message management section 513.

The message management section 513 receives the message or comment from the control section 512 and stores it into the message DB 502. Further, the message management section 513 obtains a registered message and/or comment from the message DB 502 and transmits the message and/or comment to the control section 512 in accordance with a request from the control section 512.

Figure 6:
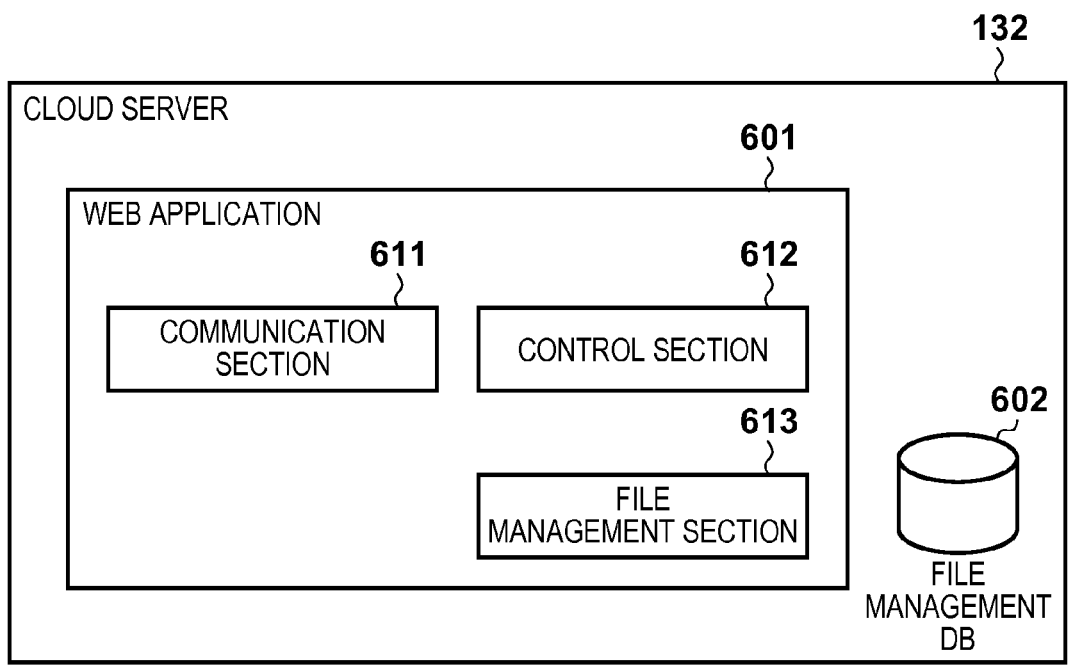
FIG. 6 is a functional block diagram showing a software configuration of a cloud server to provide a document management service.

FIG. 6 is a functional block diagram showing a software configuration of the cloud server 132 to provide a document management service according to the embodiments. The respective functions shown in FIG. 6 are realized by execution of a control program with the CPU 311 of the cloud server 132.

The cloud server 132 has a Web application 601 and a file management database 602 (hereinbelow, "file management DB 602").

The Web application 601 is a Web application to provide a document management service or the like. The Web application 601 has a communication section 611, a control section 612 and a file management section 613. The communication section 611 receives a request from the image forming apparatus 101 and the terminal 102 such as a PC, and transmits the content of the request to the control section 612. Further, the communication section 611 receives the result of processing in response to the request, from the control section 612, generates response data to the request and transmits the response to the image forming apparatus 101 and the terminal 102. The control section 612 issues a request to perform processing of storage, deletion, movement of the transmitted file and acquisition of a list of managed files, to the file management section 613, in accordance with the content of the request received from the communication section 611. The file management section 613 accesses the file management DB 602, performs storage, deletion, movement of the transmitted file, and acquisition of a list of managed files, and transmits the result of processing to the control section 612, in accordance with the processing request transmitted from the control section 612.

FIG. 7 is an explanatory diagram showing the microblog function provided from the cloud server 131 to provide the CRM services according to the embodiments.

FIG. 7 shows a display example of a Web page indicated when the cloud server 131 is accessed from a Web browser operating on the terminal 102 such as a PC. In this example, the cloud server 131 manages currently in-progress business negotiation information for the purpose of business support. Numeral 701 denotes a company A business negotiation screen to display information regarding business negotiation with the company A. The business negotiation screen 701 has a business negotiation details area 702 to display a business negotiation name as information regarding the business negotiation, a business connection responsible person, the telephone number of the business connection and the like, a message display area 703, a comment input area 704, and a message input area 705. The message display area 703 displays a time line formed with a message and comments on the message. In the message display area 703, an MFP A has registered a message 711 "scan document prepared". With respect to the message 711, a user B returns a comment 712 "Send PDF file by E-Mail". Similarly, as a comment 713, a user C has registered his/her comment describing that the PDF file is to be stored in the cloud storage A, and further, the PDF file is to be shared with user D.

In the comment input area 704, when a user inputs a comment in a comment input field 721 and presses an add button 722, a comment addition request is transmitted from the Web browser on the terminal 102 to the cloud server 131. The cloud server 131 receives the request, and registers the input comment into the message DB 502. With this arrangement, as in the case of the above-described comments 712 and 713, upon user's access to the cloud server 131 using the Web browser, the registered comments are displayed on the Web browser.

In the message input area 705, when the user inputs a message into a message input field 731 and presses a creation button 732, a message creation request is transmitted from the Web browser to the cloud server 131. The cloud server 131 receives the request, and registers the input message into the message DB 502. With this arrangement, as in the case of the above-described message 711, upon user's access to the cloud server 131 using the Web browser, the registered message is displayed on the Web browser.

[First Embodiment]

FIG. 8 is a sequence diagram for describing operations of the image forming apparatus 101, the cloud server 131 and the cloud server 132, to perform a series of processing according to a first embodiment of the present invention.

At timing 801, scan processing is performed in the image forming apparatus 101 in accordance with the user's instruction. In the scan processing, the scanner unit 221 scans an image on an original document and obtains image data resulted from the scanning. At timing 802, the image forming apparatus 101 stores the image data obtained at timing 801, as scan data, into the scan DB 405 of the image forming apparatus 101. Then at timing 803, the image forming apparatus 101 transmits a message "Scan document prepared" to the cloud server 131.

With this operation, at timing 804, the cloud server 131 receives the message transmitted from the image forming apparatus 101, registers it into the message DB 502. Then hereinafter, the image forming apparatus 101 itself monitors as to whether or not any comment is added with respect to the message registered in the cloud server 131. For this purpose, at timing 805, the image forming apparatus 101 transmits a comment monitoring request to the cloud server 131 to check presence/absence of additional comment. In this manner, the image forming apparatus 101 checks presence/absence of additional comment periodically.

At timing 806, it is assumed that the user C accesses the cloud server 131 utilizing the Web browser of the terminal 102 such as a PC or a mobile terminal to check the message registered from the image forming apparatus 101. When the user C desires to have data generated by scanning with the image forming apparatus 101, the user C inputs data format of the desired data and a cloud storage service as the data transmission destination into the comment input area 704. For example, when it is desired that a PDF file is stored into the cloud storage A and further it is shared with the user D (the user D is allowed to access the PDF file), the user C inputs a comment "Share PDF file with User D by Cloud Storage A". After the input of the comment, when the user C presses an add button 722, a comment addition request is transmitted from the Web browser of the terminal 102 to the cloud server 131. Then the cloud server 131 receives the comment addition request transmitted from the Web browser in the terminal of the user C, and at timing 807, registers the comment into the message DB 502.

On the other hand, at timing 808, the image forming apparatus 101 detects by comment monitoring that the comment has been added. Then, the image forming apparatus 101 obtains the comment inputted by the user C, "Share PDF file with User D by Cloud Storage A" and analyzes the comment. Then the image forming apparatus 101 obtains information, as an ID of the transmission destination cloud server 132, "Cloud Storage A", and information, as a user ID on the cloud server 132, "User D". By the above processing, the image forming apparatus 101 detects the reception of a request for image data transmission to the "User D".

Next, at timing 809, the image forming apparatus 101 determines whether or not it is possible to access the transmission destination cloud server 132 using the authentication data of the image forming apparatus 101 used upon access to the cloud server 131. When it is determined that it is possible to access the cloud server 132, the image forming apparatus 101 determines that file transmission to the "Cloud Storage A" is possible, then performs file transmission at timing 811. On the other hand, when it determines that it is not possible to access the cloud server 132, the image forming apparatus 101 performs processing at timing 810. Note that it is determined that it is possible to access the cloud server 132 when, for example, the cloud server 131 and the cloud server 132 are provided by the same service provider and it is possible to access them using the same user ID and the same password.

At timing 810, the image forming apparatus 101 obtains authentication data to access the "Cloud Storage A" held in the image forming apparatus 101 from the image forming apparatus 101, from the authentication DB 407. Then at timing 811, the image forming apparatus 101 transmits the scan data, converted to a PDF file, to the cloud server 132 (Cloud Storage A) using the obtained authentication data. At timing 812, the image forming apparatus 101 transmits a request to the cloud server 132 to perform setting such that the transmitted image data is shared with the user D. With this setting, as the user D can access the scan data uploaded onto the cloud server 132, the distribution of the scan data to the user D is completed.

Figure 9A:
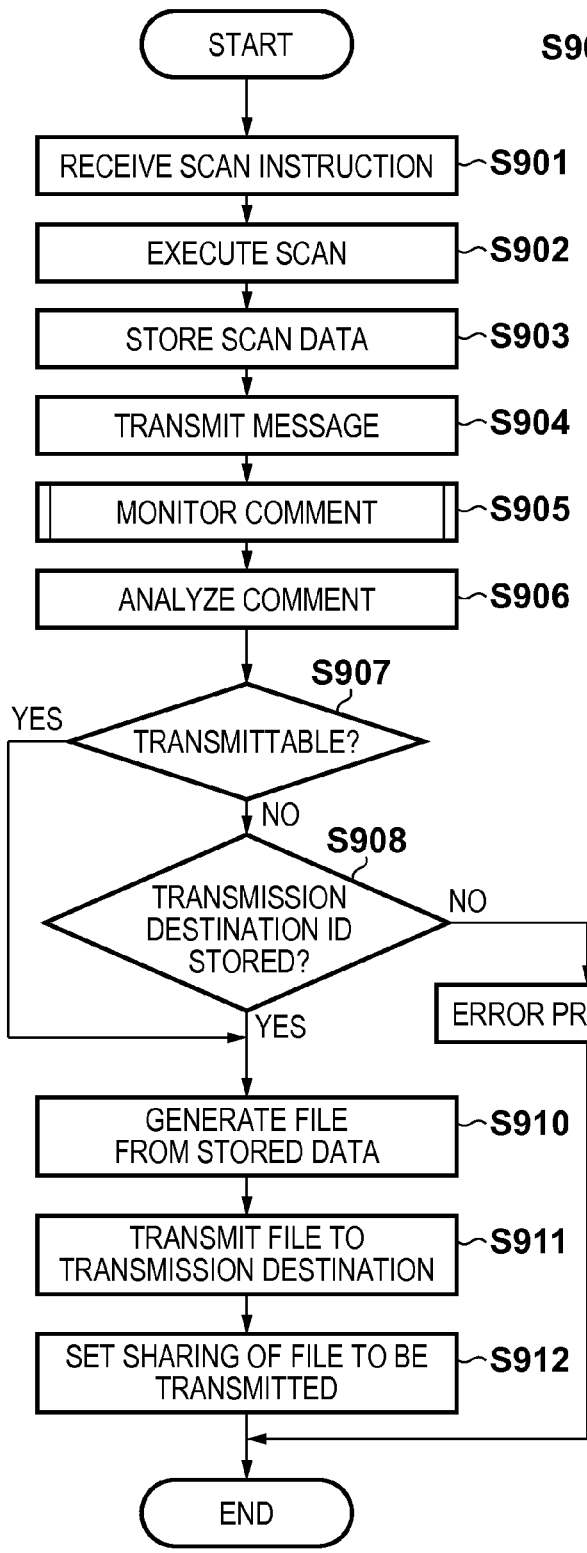
FIGS. 9A and 9B are flowcharts for describing an operation of the image forming apparatus according to the first embodiment.
Figure 9B:
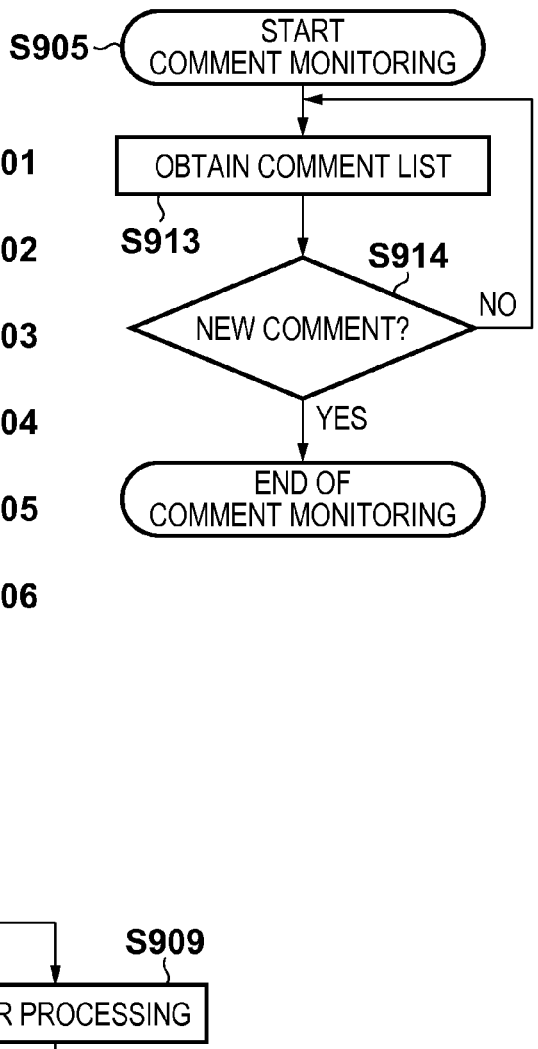

FIGS. 9A and 9B are flowcharts for describing the operation of the image forming apparatus 101 according to the first embodiment of the present invention. Note that a program to perform this processing is stored in the ROM 212, and the processing is realized by execution of the program under the control of the CPU 211.

First, in step S901, the screen display section 400 detects that the user has inputted a scan execution instruction via the operation screen. Next, the process proceeds to step S902, at which the screen display section 400 notifies the job processing section 404 of the scan job execution instruction. Then the job processing section 404, in accordance with the scan job execution instruction, issues a request to execute the scan processing to the control unit 210. Then the control unit 210, in accordance with the scan processing execution request, executes the scanning by the scanner unit 221 via the scanner I/F 217. The scanner unit 221, in accordance with the request from the control unit 210, reads an image on an original document and generates image data, then transmits the image data via the scanner I/F 217 to the control unit 210. Then the control unit 210 receives the image data, and transmits the received image data, as the result of execution of the scan processing, to the job processing section 404. The processing in step S902 is as described above.

Then the process proceeds to step S903, at which the job processing section 404 issues a request to store the received image data as scan data, to the scan data management section 403. Then the scan data management section 403 stores the image data, as scan data, into the scan DB 405, and notifies the job processing section 404 of the completion of the storage of the scan data.

Next, the process proceeds to step S904, at which the job processing section 404 receives the notification of the completion of the storage, then issues a request to transmit a message to the microblog communication management section 402. In accordance with the order, the microblog communication management section 402 generates a message including a content "scan document 1 prepared", and transmits a message transmission request and the message to the communication section 401. The communication section 401 receives the message transmission request from the microblog communication management section 402, and transmits the received message to the cloud server 131. By the transmission of the message to the cloud server 131, the message is registered in the microblog function provided with the cloud server 131. With this arrangement, in the microblog function provided with the cloud server 131, a "time line" with respect to the message is generated. Upon access to the cloud server 131 from the user using the Web browser or the like, the message as shown in FIG. 7 is displayed, and communication with other users is realized by exchanging messages and comments.

Next, the process proceeds to step S905, the CPU 211 monitors the time line" of the registered message. The method of monitoring will be described in steps S913 and S914 in FIG. 9B. In step S906, the microblog communication management section 402 receives the comment with respect to the registered message and analyzes the comment. The comment is described in the following format, for example, "Share PDF file with User D by Cloud Storage A". The microblog communication management section 402 specifies, from this comment, the cloud server 132 (Cloud Storage A) as a transmission destination of the image data, a user to share the image data (user D as the image data distribution destination), and the data format (PDF file) of the image data to be transmitted.

In step S907, the microblog communication management section 402 determines, using the authentication data upon access to the cloud server 131, whether or not it is possible to access the cloud server 132 specified in the above-described step S906. When it is possible to access the cloud server 131, the process proceeds to step S910. On the other hand, when it is determined that it is impossible to access the cloud server 131, the process proceeds to step S908, at which the microblog communication management section 402 notifies the authentication data management section 406 of information on the cloud server 132 specified in the above-described step S906. The authentication data management section 406 performs a search on the authentication DB 407 based on the information, and obtains authentication data for the image forming apparatus 101 to access the notified cloud server 132. The authentication DB 407 manages cloud server names and authentication data (user IDs and passwords) upon data transmission. It is possible to retrieve necessary authentication data with a cloud server name as a key. The authentication data management section 406 notifies the microblog communication management section 402 of the obtained authentication data, or when no corresponding authentication data is found, of the absence of authentication data. When the authentication data has been notified from the authentication data management section 406, the microblog communication management section 402 determines that the authentication data for the transmission-destination cloud server 132 is held in the image forming apparatus 101. Then the process proceeds to step S910. When no authentication data has been notified from the authentication data management section 406, the microblog communication management section 402 determines that the authentication data of the cloud server 132 is not held in the image forming apparatus 101, and the process proceeds to step S909.

In step S909, the microblog communication management section 402 determines that it is impossible to transmit the file to the cloud server 132, and performs error processing. As the error processing, it may be arranged such that the microblog communication management section 402 generates a message "transmission failed" and issues a request to transmit the message to the communication section 401. With this processing, the message "transmission failed" is transmitted from the communication section 401 to the cloud server 131, and a comment notifying the transmission failure is registered with respect to the comment from the user.

In step S910, the microblog communication management section 402 notifies the scan data management section 403 of the acquisition of the image data including the data format of the image data to be transmitted obtained in the above-described step S906. The scan data management section 403 receives the notification, then obtains image data corresponding to the time line of the corresponding comment from the scan DB 405, and converts the image data in the data format included in the image data acquisition request. Then, the scan data management section 403 transmits the converted image data to the microblog communication management section 402.

Next, the process proceeds to step S911, at which the microblog communication management section 402 transmits a file transmission request to the communication section 401. The file transmission request includes the image data converted with the scan data management section 403, the authentication data obtained in step S908, and information on the transmission destination cloud server 132 obtained in step S906. The communication section 401 receives the file transmission request, and transmits the image data to the transmission destination cloud server 132 using the authentication data included in the file transmission request.

Then, the process proceeds to step S912, at which the microblog communication management section 402 transmits a file sharing request, including the information on the cloud server 132 specified in the above-described step S906 and a user ID of the user to share the file, to the communication section 401. The communication section 401 receives the file sharing request, and transmits a request to change the setting so as to share the image data on the cloud server 132, transmitted in step S911, with the user having the user ID included in the file sharing request, to the cloud server 132. Note that the authentication data used with the communication section 401 upon transmission to the cloud server 132 at this time is the authentication data obtained in step S908 for the image forming apparatus 101 to access the cloud server 132.

FIG. 9B is a flowchart for describing the processing in step S905.

In step S913, the microblog communication management section 402 transmits a list acquisition request to obtain comments with respect to the time line of the message registered in the above-described step S904 to the communication section 401. The communication section 401 receives the list acquisition request, then transmits the list acquisition request to the cloud server 131, and obtain a list of comments from the cloud server 131. The communication section 401 transmits the obtained list of comments to the microblog communication management section 402. Next, the process proceeds to step S914, at which the microblog communication management section 402 receives the list of comments, and extracts a difference from a previously obtained list of comments. When there is a difference between the currently obtained list of comments and the previously obtained list of comments, the microblog communication management section 402 determines that a new comment exits, and terminates the comment monitoring processing (proceeds to step S906).

When there is no difference between the currently obtained list of comments and the previously obtained list of comments, the microblog communication management section 402 determines that no new comment exists. Then the process proceeds to step S913.

According to the first embodiment, it is possible to transmit image data to a cloud server and register the image data there by using authentication data of the image forming apparatus itself to access the cloud server. Then, it is possible, even when the image forming apparatus does not have authentication data of a user as a distribution destination, to appropriately distribute the image data to the user, by setting such that the registered image data is to be shared with the distribution destination user.

Note that in the first embodiment, with the comment in the microblog function as a trigger, the image forming apparatus 101 determines whether or not transmission to a designated transmission destination is possible, then authentication data of the transmission destination is obtained and image data is transmitted. However, the transmission trigger is not necessarily a comment in the microblog function. Further, the image data to be transmitted is not necessary data obtained by scanning. For example, image data, transmitted from a printer driver on a PC on the network to the image forming apparatus 101, may be used.

[Second Embodiment]

Next, a second embodiment of the present invention will be described. In the second embodiment, in the structure described in the above-described first embodiment, it is additionally arranged such that when the image forming apparatus 101 does not have authentication data to access the cloud server 132 in the authentication DB 407, an inquiry about the authentication data is made to the user. Note that the constituent elements the same as those in the above-described first embodiment have the same reference numerals and the detailed explanations of these elements will be omitted.

FIG. 10 is a sequence diagram for describing the operations of the image forming apparatus 101, the cloud server 131 and the cloud server 132 to perform the series of processing according to the second embodiment. Note that as the timings 801 to 809 are the same as those in FIG. 8 of the above-described first embodiment, the explanations of these timings will be omitted.

At timing 1001, the image forming apparatus 101 transmits a comment including an authentication URL link onto the time line of the message registered at timing 803, to the cloud server 131. The comment transmitted at this time is, e.g., "Scan document prepared. Access http://aaa.com". Next, at timing 1002, the user accesses the cloud server 131 using the Web browser of the terminal 102 such as a PC or a mobile terminal, to check the comment registered from the image forming apparatus 101. At timing 1003, the user clicks the URL link, included in the comment checked by the user at timing 1002, on the Web browser of the terminal 102, to transmit a request to the image forming apparatus 101.

Then, the image forming apparatus 101 receives the request at timing 1004, and generates a response to display a screen to input authentication data. The screen to input authentication data includes a text input area to input a user ID and a password as authentication data and a submit button. Thus the Web browser of the terminal 102 displays the screen, and the user inputs authentication data. Then it is possible to transmit the user ID and the password, necessary for the image forming apparatus 101 to access the cloud server 132, from the terminal 102 to the image forming apparatus 101.

At timing 1005, the image forming apparatus 101 transmits the response generated at timing 1004 (authentication screen information) to the Web browser of the terminal 102 used by the user. Then the authentication screen to input authentication data is displayed on the Web browser of the terminal 102 used by the user.

Then, at timing 1006, the user inputs authentication data to access the cloud server 132 in the screen to input authentication data, at the terminal 102, and presses the submit button. The Web browser transmits the inputted authentication data to the image forming apparatus 101 at the timing of depression of the submit button. The authentication data received with the image forming apparatus 101 at this timing is authentication data to access the cloud server 132. Then at timing 1007, the image forming apparatus 101 converts the scan data into a PDF file and transmits the PDF file to the cloud server 132 (Cloud Storage A) using the received authentication data.

Figure 11:
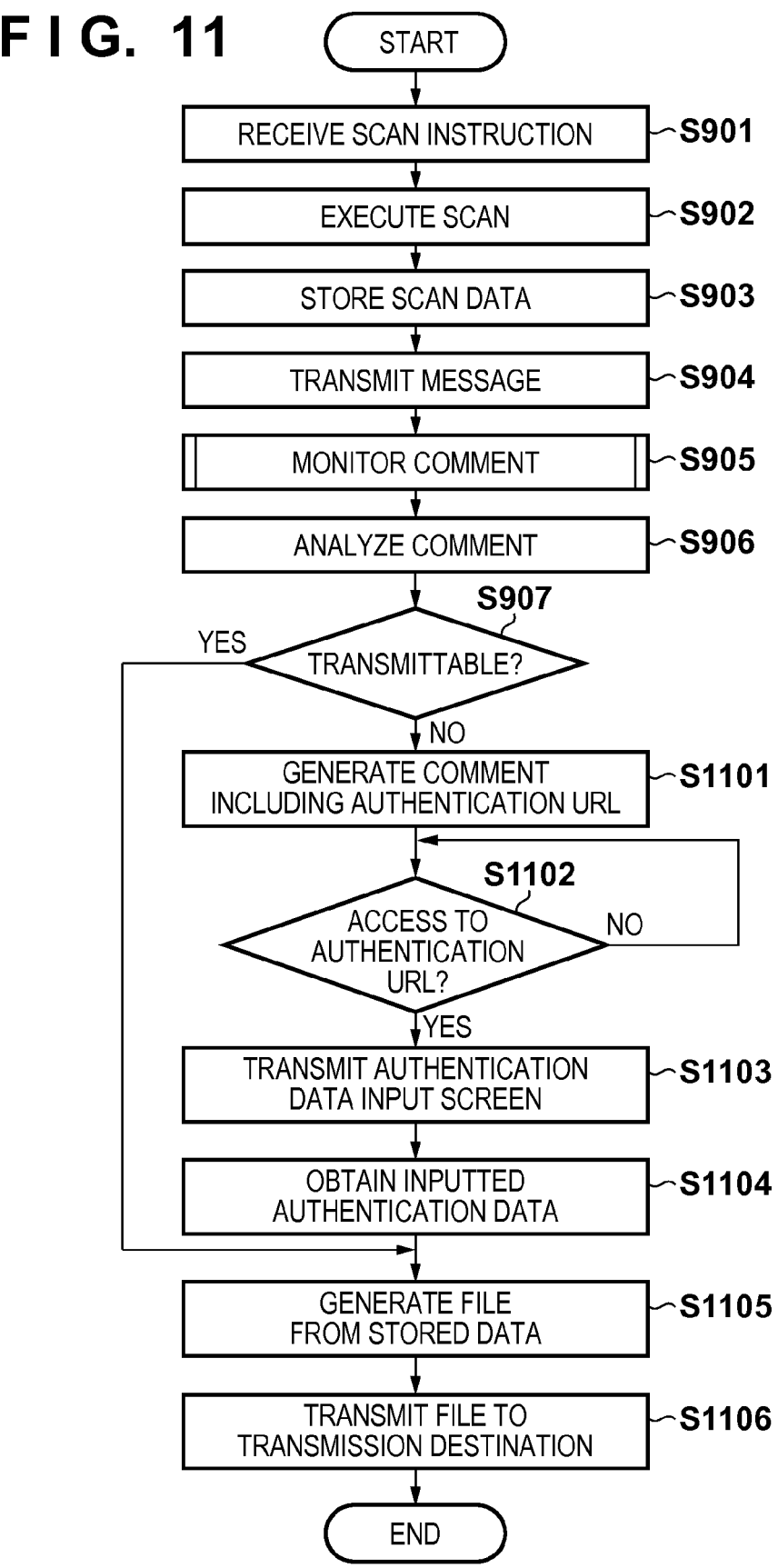
FIG. 11 is a flowchart for describing the operation of the image forming apparatus according to the second embodiment.

FIG. 11 is a flowchart for describing the operation of the image forming apparatus 101 according to the second embodiment of the present invention. Note that as steps S901 to S907 are the same as those in FIG. 9A of the above-described first embodiment, the explanations of these steps will be omitted.

In step S1101, the microblog communication management section 402 generates a comment including URL link information to the authentication data input screen, "Transmission prepared. https://xxx.com/auth", and transmits a comment transmission request and the comment to the communication section 401. The communication section 401 receives the comment transmission request from the microblog communication management section 402, and transmits the received comment to the cloud server 131. With this arrangement, when the user accesses the cloud server 131 from the Web browser of the terminal 102 or the like, the comment including the URL link information to display the authentication data input screen s displayed. Next, the process proceeds to step S1102, at which the microblog communication management section 402 determines whether or not a URL request to display the authentication data input screen has been received in the communication section 401. When the request has been received, the process proceeds to step S1103. When the request has not been received, the microblog communication management section 402 again determines whether or not the URL request to the authentication data input screen has been received in the communication section 401.

In step S1103, the microblog communication management section 402 receives the URL request to display the authentication data input screen from the communication section 401, and generates an HTML file for the authentication data input screen. The HTML file for the authentication data input screen is any file as long as it is an HTML file including a text input area to input a user ID and a password as authentication data and a submit button. Then it is possible to display the authentication data input screen to input a user ID and a password, necessary upon access to the cloud server 132, on the Web browser of the terminal 102. The microblog communication management section 402 includes the generated HTML file in the response to the URL request, and transmits the response to the communication section 401. The communication section 401 receives the response, and returns the response to the Web browser of the terminal 102 (client) that transmitted the request. Thus, the authentication data input screen is displayed on the Web browser of the user's terminal 102.

Next, the process proceeds to step S1104, at which the user inputs authentication data (an ID, a password and the like) in the authentication data input screen displayed on the Web browser of the user's terminal 102, and presses the submit button. The authentication data is transmitted from the Web browser of the terminal 102 to the image forming apparatus 101. The communication section 401 receives the authentication data, and transmits the authentication data to the microblog communication management section 402. Note that the authentication data received with the image forming apparatus 101 is authentication data for the user to access the cloud server 132. Next, in step S1105, the microblog communication management section 402 transmits an image data acquisition request including data format of the image data to be transmitted, obtained in step S906, to the scan data management section 403. The scan data management section 403 receives the image data acquisition request, then obtains image data corresponding to the time line of the comment from the scan DB 405, and converts the image data into the data format included in the image data acquisition request. The scan data management section 403 transmits the converted image data to the microblog communication management section 402. Next, the process proceeds to step S1106, at which the microblog communication management section 402 transmits the file transmission request to the communication section 401. The file transmission request includes the image data converted with the scan data management section 403, the authentication data obtained in step S1104, and information on the transmission destination cloud server 132 obtained in step S906. The communication section 401 receives the file transmission request, and transmits the image data to the transmission destination cloud server 132 using the authentication data included in the file transmission request.

As described above, according to the second embodiment, even when the image forming apparatus does not have authentication data necessary upon access to the cloud service, authentication data to access the cloud service can be obtained from the user. With this arrangement, it is possible to transmit image data, formed by scanning with the image forming apparatus, to a cloud service which requires authentication and appropriately distribute the image data to the user.

[Third Embodiment]

Next, a third embodiment of the present invention will be described. In the third embodiment, in addition to the structure described in the above-described second embodiment, it is arranged such that the authentication data to access the cloud server 132, once inputted by the user, is held in the authentication DB 407 of the image forming apparatus 101. Note that constituent elements the same as those in the above-described first and second embodiments have the same reference numerals, and the detailed explanations of these elements will be omitted.

Figure 12:
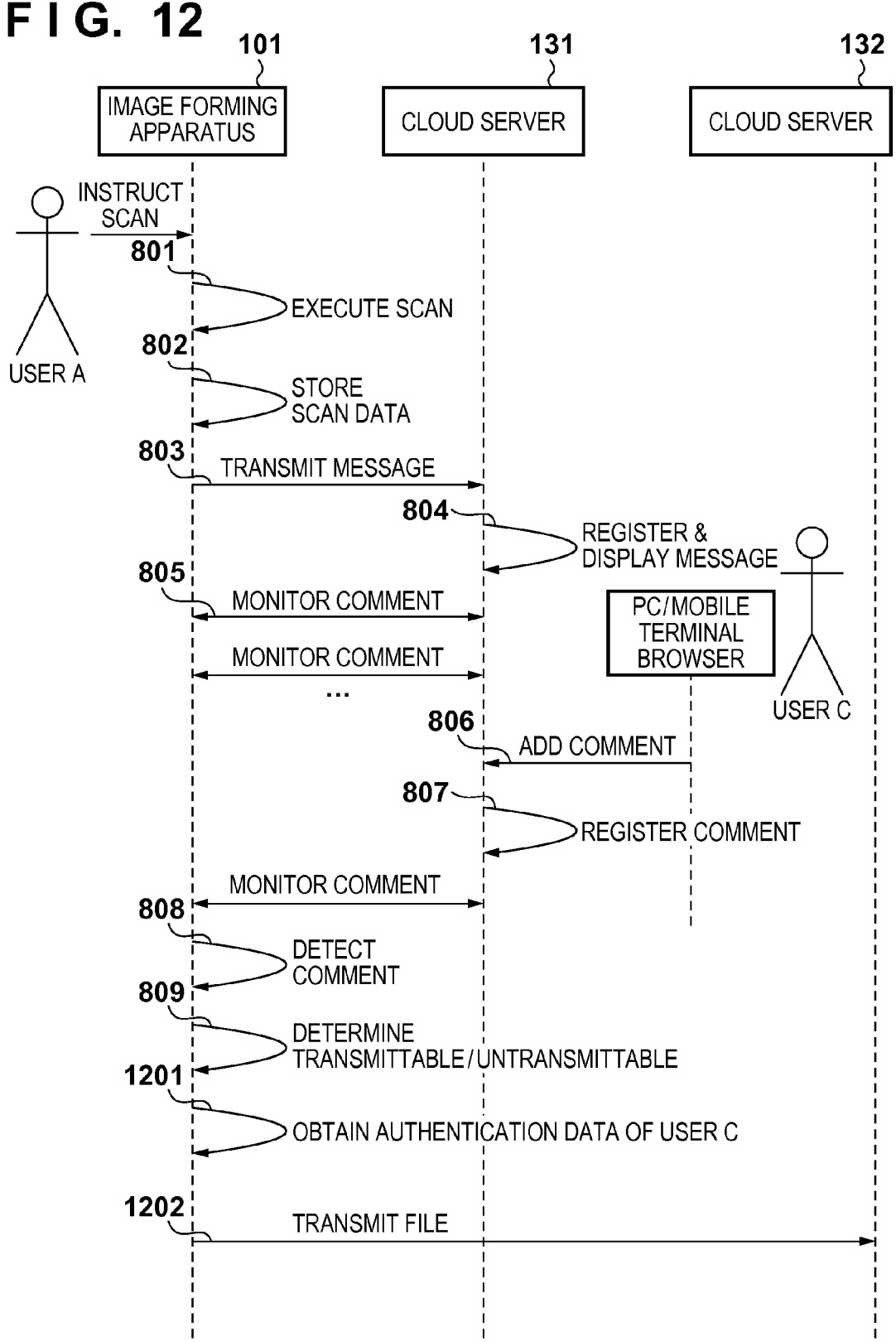
FIG. 12 is a sequence diagram for describing the operations of the image forming apparatus according to a third embodiment of the present invention and the cloud servers to perform the series of processing.

FIG. 12 is a sequence diagram for describing the operations of the image forming apparatus 101, the cloud server 131 and the cloud server 132 to perform the series of processing according to the third embodiment. In FIG. 12, as timings 801 to 809 are the same as those in FIG. 8 of the above-described first embodiment, the explanations of the timings will be omitted.

At timing 1201, the image forming apparatus 101 obtains authentication data of the user C to the "Cloud Storage A" held in the image forming apparatus 101. Next, at timing 1202, the image forming apparatus 101 converts the scan data into a PDF file and transmits the PDF file to the "Cloud Storage A" using the obtained authentication data.

FIG. 13 is a flowchart for describing the operation of the image forming apparatus 101 according to the third embodiment. Note that as steps S901 to S907 are the same as those in FIG. 9A of the above-described first embodiment, the explanations of these steps will be omitted. Further, as steps S1101 to S1105 are the same as those in the above-described second embodiment, the explanations of these steps will be omitted.

In step S1301, from the information included in the new comment detected in step S905, the microblog communication management section 402 obtains user information on the user who registered the comment in the clod server 131. Next, the process proceeds to step S1302, the microblog communication management section 402 notifies the authentication data management section 406 of the user information in the cloud server 132 specified in step S1301. The authentication data management section 406 performs a search on the authentication DB 407, and obtains the authentication data of the user based on the notified user information. In the authentication DB 407, cloud server names, user IDs, and authentication data (IDs and passwords) upon data transmission are managed. It is possible to retrieve necessary authentication data with a cloud server name and a user ID as a key. The authentication data management section 406 notifies the microblog communication management section 402 of the obtained authentication data, or when no corresponding authentication data is found, of the absence of authentication data. When authentication data is notified from the authentication data management section 406, the microblog communication management section 402 determines that the user ID in the transmission destination is held, and the process proceeds to step S1303. On the other hand, when authentication data is not notified from the authentication data management section 406, the microblog communication management section 402 determines that the user ID of the transmission destination is not held, and the process proceeds to step S1101.

In step S1303, the microblog communication management section 402 transmits an image data acquisition request, including data format of the image data obtained in step S906, to the scan data management section 403. The scan data management section 403 receives the image data acquisition request, then obtains image data corresponding to the time line of the comment from the scan DB 405, and converts the image data into the data format included in the image data acquisition request. Then the scan data management section 403 transmits the converted image data to the microblog communication management section 402.

The process proceeds to step S1304, at which the microblog communication management section 402 transmits a file transmission request to the communication section 401. The file transmission request includes the image data converted with the scan data management section 403, the authentication data obtained in step S1104 or step S1302, and the information on the transmission destination cloud server 132 obtained in step S906. The communication section 401 receives the file transmission request, and transmits the image data to the transmission destination cloud server 132 using the authentication data included in the file transmission request. Next, the process proceeds to step S1305, at which the microblog communication management section 402 transmits the user information specified in step S1301 and the authentication data used in the file transmission to the authentication data management section 406. The authentication data management section 406 stores the user information in the cloud server 132 as the destination of file transmission, specified in step S1301 and the authentication data used in the file transmission, into the authentication DB 407. Note that file transmission request includes the image data converted with the scan data management section 403, the authentication data obtained in step S1104 or step S1302 and the information on the transmission destination cloud server 132 obtained in step S906. The communication section 401 that has received the file transmission request, transmits the image data to the transmission destination cloud server 132 using the authentication data included in the file transmission request.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-159276, filed Jul. 20, 2011, and 2012-147601, filed Jun. 29, 2012, which are hereby incorporated by reference herein in their entirety.

What is claimed is:

1. An image processing apparatus communicable with a server via a network, comprising:
   a detection unit configured to detect a transmission request to transmit image data to a particular user;
   an acquisition unit configured to, in a case that the detection unit detects the transmission request, acquire authentication data of the image processing apparatus, necessary to transmit the image data to the server;
   a transmission unit configured to transmit the image data to the server using the authentication data acquired with the acquisition unit; and
   a setting unit configured to set sharing with the particular user with respect to the image data,
   wherein the detection unit detects the transmission request by monitoring a comment registered from a terminal on the network.

2. The image processing apparatus according to claim 1, further comprising a storage unit configured to hold the authentication data of the image processing apparatus,
   wherein the acquisition unit acquires the authentication data of the image processing apparatus stored in the storage unit.

3. The image processing apparatus according to claim 1, wherein the comment registered from the terminal on the network is a return message to a message transmitted from the image processing apparatus.

4. An image processing apparatus communicable with a server via a network, comprising:
   a detection unit configured to detect a transmission request to transmit image data to a particular user;
   a provision unit configured to, in a case that the detection unit detects the transmission request, provide information to display a screen to input authentication data necessary to transmit the image data to the server; and
   a transmission unit configured to transmit the image data to the server using the authentication data inputted via the screen,
   wherein the detection unit detects the transmission request by monitoring a comment registered from a terminal on the network.

5. The image processing apparatus according to claim 4, wherein the comment registered from the terminal on the network is a reply to a message transmitted from the image processing apparatus.

6. The image processing apparatus according to claim 4, wherein the provision unit registers a URL to display the screen as an additional comment on the comment registered from the terminal on the network.

7. The image processing apparatus according to claim 4, further comprising a holding unit configured to hold the authentication data inputted via the screen.

8. A control method for an image processing apparatus communicable with a server via a network, comprising:
   a detection step of detecting a transmission request to transmit image data to a particular user;
   an acquisition step of, in a case that the transmission request is detected in the detection step, acquiring authentication data of the image processing apparatus, necessary to transmit said image data to the server;
   a transmission step of transmitting the image data to the server using the authentication data acquired in the acquisition step; and
   a setting step of setting sharing with the particular user with respect to the image data,
   wherein the detection step detects the transmission request by monitoring a comment registered from a terminal on the network.

9. A control method for an image processing apparatus communicable with a server via a network, comprising:
   a detection step of detecting a transmission request to transmit image data to a particular user;
   a provision step of, in a case that the transmission request is detected in the detection step, providing information to display a screen to input authentication data necessary to transmit the image data to the server; and
   a transmission step of transmitting the image data to the server using the authentication data inputted via the screen,
   wherein the detection step detects the transmission request by monitoring a comment registered from a terminal on the network.

10. A non-transitory computer readable storage medium storing a program for causing a computer to implement the control method according to claim 8.

11. A non-transitory computer readable storage medium storing program for causing a computer to implement the control method according to claim 9.

* * * * *